US008053510B2

United States Patent
Sandstrom et al.

(10) Patent No.: US 8,053,510 B2
(45) Date of Patent: Nov. 8, 2011

(54) PNEUMATIC TIRE

(75) Inventors: Erik Paul Sandstrom, Uniontown, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/553,384

(22) Filed: Sep. 3, 2009

(65) Prior Publication Data

US 2011/0054109 A1    Mar. 3, 2011

(51) Int. Cl.
  *C08L 9/00*    (2006.01)
  *C08L 9/02*    (2006.01)
  *C08L 9/06*    (2006.01)
  *C08F 291/02*    (2006.01)
  *C08F 267/00*    (2006.01)
  *C08F 267/02*    (2006.01)

(52) U.S. Cl. ............ 524/508; 524/5; 524/571; 524/565; 524/502; 524/522

(58) Field of Classification Search .................. 524/508, 524/571, 565, 502, 5, 522
  See application file for complete search history.

(56) References Cited

U.S. PATENT DOCUMENTS

| 4,513,123 A | 4/1985 | Day et al. ................... 525/332.6 |
| 5,176,767 A * | 1/1993 | Hoshino et al. ............... 152/451 |
| 5,328,949 A | 7/1994 | Sandstrom et al. ........... 524/262 |
| 5,792,800 A | 8/1998 | Wideman et al. ............. 524/240 |
| 6,230,773 B1 | 5/2001 | Sandstrom et al. ........... 152/517 |
| 6,662,840 B2 | 12/2003 | Thielen et al. ................. 152/547 |
| 7,259,199 B2 | 8/2007 | Sandstrom ..................... 524/100 |
| 2001/0023729 A1* | 9/2001 | Sandstrom et al. ........... 152/517 |
| 2006/0128841 A1* | 6/2006 | Sandstrom .................... 524/100 |

FOREIGN PATENT DOCUMENTS

| EP | 0 629 652 A1 | 12/1994 |
| EP | 0 852 248 A1 | 7/1998 |
| EP | 0 901 914 A1 | 3/1999 |
| EP | 0 943 466 A2 | 9/1999 |
| EP | 2 072 282 A1 | 6/2009 |

OTHER PUBLICATIONS

European Search Report completed Nov. 19, 2010.

\* cited by examiner

*Primary Examiner* — James J Seidleck
*Assistant Examiner* — Deve E Valdez
(74) *Attorney, Agent, or Firm* — John D. DeLong

(57) ABSTRACT

The present invention is directed to a pneumatic tire having a wire-reinforced component comprising (A) a metallic wire; and
  (B) a rubber composition contacting the wire, the rubber composition comprising
    (1) a diene based elastomer; and
    (2) from 2 to 20 phr of at least one carboxylic acid selected from the group consisting of salicylic acid and dithiodipropionic acid.

10 Claims, No Drawings

PNEUMATIC TIRE

BACKGROUND OF THE INVENTION

A tire is a composite of several components each serving a specific and unique function yet all synergistically functioning to produce the desired performance. In several tire components, an in-situ resin is included in a rubber composition to impart desirable properties to the rubber composition, including hardness, tear strength, and adhesion to reinforcement. Typically, methylene acceptor-methylene donor systems are used as in-situ resins. Performance and safety requirements place an ever increasing demand for improved rubber compounds. Therefore, there exists a need for improved rubber compositions particularly for use in wire-reinforced tire applications, such as tire beads.

SUMMARY OF THE INVENTION

The present invention is directed to a pneumatic tire having a wire-reinforced component comprising
(A) a metallic wire; and
(B) a rubber composition contacting the wire, the rubber composition comprising
   (1) a diene based elastomer; and
   (2) from 2 to 20 phr of at least one carboxylic acid selected from the group consisting of salicylic acid and dithiodipropionic acid.

DETAILED DISCLOSURE OF THE INVENTION

There is disclosed a pneumatic tire having a wire-reinforced component comprising
(A) a metallic wire; and
(B) a rubber composition contacting the wire, the rubber composition comprising
   (1) a diene based elastomer; and
   (2) from 2 to 20 phr of at least one carboxylic acid selected from the group consisting of salicylic acid and dithiodipropionic acid.

The present invention relates to a pneumatic tire. Pneumatic tire means a laminated mechanical device of generally toroidal shape (usually an open torus) having beads and a tread and made of rubber, chemicals, fabric and steel or other materials. The present invention relates to both bias and radial-ply tires. In one embodiment, the present invention is a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

The rubber composition comprises at least one carboxylic acid selected from the group consisting of salicylic acid and dithiodipropionic acid. In one embodiment, the rubber composition includes from 2 to 20 phr of at least one carboxylic acid selected from the group consisting of salicylic acid and dithiodipropionic acid. In one embodiment, the rubber composition includes from 3 to 15 phr of at least one carboxylic acid selected from the group consisting of salicylic acid and dithiodipropionic acid.

The rubber composition for use in the tire component contains a natural or synthetic diene based elastomer or rubber. Representative of the rubbers include medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof. In one embodiment, the rubber is natural rubber, styrene-butadiene rubber or cis-polybutadiene.

The component of the tire of the present invention may further contain an in-situ resin that is the reaction product of a methylene acceptor and a methylene donor.

In-situ resins are formed in the rubber stock and involve the reaction of a methylene acceptor and a combination methylene donor. The term "methylene donor" is intended to mean a chemical capable of reacting with a methylene acceptor and generate the resin in-situ. Examples of methylene donors which are suitable for use in the present invention include hexamethylene tetramine and N-substituted oxymethylmelamines, of the general formula:

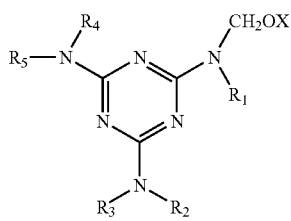

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine, N,N'N"-tributyl-N,N',N"-trimethylol-melamine, hexamethoxymethylmelamine, and hexamethoxymethylmelamine. The N-methylol derivatives of melamine are prepared by known methods.

The amount of methylene donor in the rubber stock may vary. In one embodiment, the amount of additional methylene donor ranges from 0.5 to 4 phr. In another embodiment, the amount of additional methylene donor ranges from 1 to 3 phr.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof. Examples of methylene acceptors include but are not limited to those disclosed in U.S. Pat. No. 6,605,670; U.S. Pat. No. 6,541,551; U.S. Pat. No. 6,472,457; U.S. Pat. No. 5,945,500; U.S. Pat. No. 5,936,056; U.S. Pat. No. 5,688,871; U.S. Pat. No. 5,665,799; U.S. Pat. No. 5,504,127; U.S. Pat. No. 5,405,897; U.S. Pat. No. 5,244,725; U.S. Pat. No. 5,206,289; U.S. Pat. No. 5,194,513; U.S. Pat. No. 5,030,692; U.S. Pat. No. 4,889,481; U.S. Pat. No. 4,605,696; U.S. Pat. No. 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin. In one embodiment, the methylene acceptor is resorcinol.

Other examples of methylene acceptors include activated phenols by ring substitution and a cashew nut oil modified novolak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber stock may vary. In one embodiment, the amount of methylene acceptor ranges from 0.5 to 5 phr. In another embodiment, the amount of methylene acceptor ranges from 1 to 3 phr.

It is readily understood by those having skill in the art that the rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. In one embodiment, the addition of carbon black comprises about 20 to 200 parts by weight of diene rubber (phr). In another embodiment, from about 50 to about 100 phr of carbon black is used.

A number of commercially available carbon blacks may be used. Included in the list of carbon blacks are those known under the ASTM designations N299, N315, N326, N330, M332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 80 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the Vanderbilt Rubber Handbook (1990), Pages 343 through 362. Typical amounts of antiozonants comprise about 1 to about 5 phr. Representative antiozonants may be, for example, those disclosed in the Vanderbilt Rubber Handbook (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of the combination of the reaction product of the methylene acceptor and combination methylene donor.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. In one embodiment, the sulfur vulcanizing agent is elemental sulfur. In one embodiment, sulfur vulcanizing agents are used in an amount ranging from about 0.5 to about 8 phr. In another embodiment about 3 to about 5 phr of sulfur vulcanizing agents are used.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators may be used, including a primary accelerator which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfonamides, dithiocarbamates and xanthates. In one embodiment, the primary accelerator is a sulfonamide. In another embodiment, if a second accelerator is used, the secondary accelerator may be a guanidine, dithiocarbamate or thiuram compound.

The rubber compound may contain any of the cobalt materials known in the art to further promote the adhesion of rubber to metal. One advantage of the present invention is the reduction and possible elimination of cobalt compounds. However, it may be desirable to have some amounts that are present. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

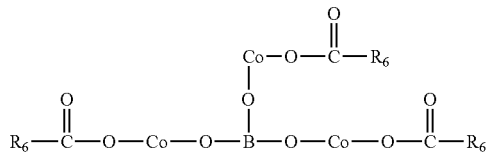

in which $R_6$ is an alkyl group having from 9 to 12 carbon atoms.

Amounts of cobalt compound which may be employed depend upon the specific nature of the cobalt material selected, particularly the amount of cobalt metal present in the compound.

In one embodiment, the amount of the cobalt material may range from about 0.2 to 5 phr. In another embodiment, the amount of cobalt compound may range from about 0.5 to 3 phr. In one embodiment, the amount of cobalt material present in the stock composition is sufficient to provide from about 0.01 percent to about 0.50 percent by weight of cobalt metal based upon total weight of the rubber stock composition. In another embodiment, the amount of cobalt material present in the stock composition is sufficient to provide from about 0.03 percent to about 0.2 percent by weight of cobalt metal based on total weight of wire coat composition.

The metallic wire or cord used according to the present invention may be steel, zinc-plated steel or brass-plated steel. Preferably, the metallic cord is brass plated steel.

The steel substrate may be derived from those known to those skilled in the art. For example, the steel used for wire may be conventional tire cord rod including AISI grades 1070, 1080, 1090 and 1095. The steel may additionally contain varying levels of carbon and microalloying elements such as Cr, B, Ni and Co.

The term "cord" means one or more of a reinforcing element, formed by one or more filaments or wires which may or may not be twisted or otherwise formed. Therefore, cords using the present invention may comprise from one (monofilament) to multiple filaments. The number of total filaments or wires in the cord may range from 1 to 134. Preferably, the number of filaments or wires per cord ranges from 1 to 49.

The wire or cord may be used in a belt structure, bead or carcass of a tire. "Belt structure" means at least two layers of plies of parallel cords, underlying the tread, unanchored to the bead and having both left and right cord angles in the range from about 17 to about 27 degrees with respect to the equatorial plane (EP) of the tire. "Carcass" means the tire structure apart from the belt structure, the tread and the undertread but including the beads. The carcass ply includes reinforcing cords embedded in an elastomeric substance and that these components are considered to be a single entry. "Bead" means that part of the tire comprising an annular tensile member wrapped by the carcass ply and shaped, with or without other reinforcement elements such as flippers, chippers, apexes, toe guards, and chafers, to fit the design rim.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

EXAMPLE I

In this example, the effect of adding salicylic acid or dithiopropionic acid to a wire coat compound is illustrated. Seven experimental rubber compounds were prepared in a lab Banbury mixer as indicated in Table 1, with amounts expressed in parts per hundred rubber (phr). Physical properties of the compounds were evaluated as indicated in Table 2.

Cure properties were determined using a Monsanto oscillating disc rheometer (MDR). A description of oscillating disc rheometers can be found in the Vanderbilt Rubber Handbook edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of *The Vanderbilt Rubber Handbook*.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), Delta torque and minutes to 90 percent of the torque increase ($T_{90}$).

Standard bead wire adhesion tests (SBAT) were conducted by embedding a single brass-plated cord in the respective rubber compositions. The rubber articles were then cured as indicated. The wire in these rubber compositions were then subjected to a pull-out test, according to ASTM Standard ASTM D1871 Method 1. The results of these pull-out tests (SBAT) and percent rubber coverage (% RC) are given below and expressed in Newtons.

TABLE 1

| | Sample No.[1] | | | | | | |
|---|---|---|---|---|---|---|---|
| | 1 | 2 | 3 | 4 | 5 | 6 | 7 |
| Resorcinol | 0 | 2.5 | 2.5 | 2.5 | 0 | 0 | 0 |
| M.A. Resin[2] | 0 | 0 | 0 | 0 | 0 | 0 | 2.5 |
| HMT[3] | 0 | 1.5 | 1.5 | 1.5 | 0 | 0 | 0 |
| HMM[4] | 0 | 0 | 0 | 0 | 0 | 0 | 3 |
| Salicylic acid[5] | 0 | 0 | 3 | 0 | 0 | 6 | 6 |
| DTDPA[6] | 0 | 0 | 0 | 3 | 6 | 6 | 0 |

[1]All rubber samples included 100 parts by weight of emulsion polymerized styrene-butadiene with standard amounts of carbon black, silica, processing oil, stearic acid, zinc oxide, accelerator and sulfur.
[2]Methylene acceptor resin, reactive phenol formaldehyde resin as SMD 30207 from Schenectady Chemicals.
[3]Hexamethylene tetramine
[4]Hexamethoxymethylamine
[5]Salicylic acid
[6]Dithiodipropionic acid

TABLE 2

| Standard Bead Wire Adhesion[7] Measured at 23° C. Unaged | | | | | | | |
|---|---|---|---|---|---|---|---|
| Adhesive Strength, N | 576 | 863 | 1118 | 1089 | 557 | 801 | 624 |
| % Rubber Coverage[8] | 0 | 0 | 30 | 10 | 0 | 0 | 0 |
| Aged | | | | | | | |
| Adhesive Strength, N | 649 | 943 | 1005 | 1024 | 618 | 780 | 639 |
| % Rubber Coverage | 0 | 0 | 10 | 10 | 0 | 0 | 0 |
| Measured at 95° C. Unaged | | | | | | | |
| Adhesive Strength, N | 368 | 627 | 704 | 701 | 467 | 613 | 600 |
| % Rubber Coverage | 0 | 0 | 20 | 0 | 0 | 0 | 0 |

TABLE 2-continued

| Aged | | | | | | | |
|---|---|---|---|---|---|---|---|
| Adhesive Strength, N | 298 | 676 | 746 | 719 | 334 | 382 | 416 |
| % Rubber Coverage | 0 | 0 | 20 | 0 | 0 | 0 | 5 |
| RPA[9], 100° C., 1 Hz | | | | | | | |
| G' @ 10%, KPa | 4360 | 5306 | 5291 | 5420 | 3768 | 2901 | 4086 |
| MDR[10] | | | | | | | |
| Max torque, dNm | 46.5 | 52.7 | 44 | 45 | 6.2 | 6 | 6.3 |
| Min torque, dNm | 5.1 | 4.7 | 5.1 | 5.6 | 11 | 11.2 | 11 |
| ATS[11] | | | | | | | |
| 50% Modulus, MPa | 7.7 | 7.5 | 6.1 | 8.1 | 5.8 | 4.5 | 5.1 |
| Hardness, 100° C. | 81 | 83 | 82 | 84 | 77 | 78 | 79 |
| Rebound, 100° C. | 58 | 51 | 45 | 48 | 48 | 37 | 40 |

[7]Standard Bead Wire Adhesion Test, according to ASTM D1871 Method 1.
[8]Percent rubber coverage of wire surface area
[9]Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber &Plastics News, Apr. 26 and May 10, 1993.
[10]Determined by a Moving Die Rheometer as model MDR-2000TM by Alpha Technologies using a cure temperature of about 160° C.
[11]Data obtained according to Automated Testing System (ATS) instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.

As seen in Tables 1 and 2, addition of salicylic acid or dithiopropionic acid to a rubber results in significantly superior adhesion to wire as compared to control.

Unexpectedly, Sample 5 containing dithiopropionic acid showed significantly higher adhesion at 95° C. for both original and aged samples as compared to control Sample 1.

Unexpectedly, Sample 6 containing a combination of salicylic acid and dithiopropionic acid showed significantly higher adhesion both original and aged samples at both 23° C. and 95° C., compared to control sample 1.

Combination of salicylic acid or dithiopropionic acid with a methylene acceptor/methylene donor pair unexpectedly results in significant improvement in adhesion as compared to the methylene acceptor/methylene donor pair alone (Sample 3 v Sample 2 for salicylic acid; Sample 4 v Sample 2 for dithiopropionic acid).

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a wire-reinforced component comprising
   (A) a metallic wire; and
   (B) a rubber composition contacting the wire, the rubber composition comprising
      (1) a rubber; and
      (2) from 2 to 20 parts by weight, per 100 parts by weight of rubber (phr) of at least one carboxylic acid selected from the group consisting of salicylic acid and dithidipropionic acid;
   wherein the wire-reinforced rubber component is a bead.

2. The tire of claim 1 wherein said rubber comprises a member selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof.

3. The tire of claim 1 further comprising an insitu resin comprising a methylene donor and methylene acceptor.

4. The tire of claim 3 wherein said methylene donor comprises a member selected from the group consisting of hexamethylenetetramine, hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine, N,N'N"-tributyl-N,N',N"-trimethylolmelamine, hexamethoxymethylmelamine, and hexaethoxymethylmelamine.

5. The tire of claim 3 wherein the methylene donor comprises hexamethoxymethylmelamine.

6. The tire of claim 3 wherein the methylene donor comprises hexamethylene tetramine.

7. The tire of claim 3 wherein the amount of methylene donor ranges from 0.5 to 4 phr.

8. The tire of claim 3, where the methylene acceptor comprises a member selected from resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof.

9. The tire of claim 1, wherein the methylene acceptor comprises resorcinol.

10. The tire of claim 1, wherein the rubber component is a wirecoat.

* * * * *